United States Patent [19]

Schoell

[11] Patent Number: 5,314,035
[45] Date of Patent: May 24, 1994

[54] SURFACE EFFECT VEHICLE

[76] Inventor: Harry L. Schoell, 2698 SW. 23rd Ave., Ft. Lauderdale, Fla. 33312

[21] Appl. No.: 926,312

[22] Filed: Aug. 10, 1992

[51] Int. Cl.$^5$ ............................ B60V 1/08; B60V 1/11
[52] U.S. Cl. .................................. 180/119; 180/120; 180/117; 244/12.1; 114/272
[58] Field of Search ............... 180/116, 117, 118, 119, 180/120, 121, 123; 114/272, 273; 244/23 R, 12.1

[56] References Cited

U.S. PATENT DOCUMENTS

| | | | |
|---|---|---|---|
| 3,190,582 | 6/1965 | Lippisch | 180/117 X |
| 3,261,419 | 7/1966 | Kaario | 180/120 |
| 3,908,783 | 9/1975 | Joerg et al. | 180/116 |
| 4,159,086 | 6/1979 | Schonfelder | 180/117 X |
| 4,705,234 | 11/1987 | Bourn | 244/12.1 |
| 4,712,630 | 12/1987 | Blum | 180/117 |

FOREIGN PATENT DOCUMENTS

| | | | |
|---|---|---|---|
| 0023340 | 2/1981 | European Pat. Off. | 180/117 |
| 0112765 | 5/1991 | Japan | 180/116 |
| 0159865 | 7/1991 | Japan | 180/117 |
| 4024159 | 1/1992 | Japan | 180/116 |

*Primary Examiner*—Margaret A. Focarino
*Assistant Examiner*—Peter English
*Attorney, Agent, or Firm*—Brooks & Kushman

[57] ABSTRACT

A surface effect vehicle having a pair of lifting scoops, or air foils, mounted on a vehicle body, one in front and the other in the rear. Each lifting scoop has an arched leading edge to collect air under the scoop to lift the vehicle on a cushion of air. The vehicle having a pusher-type engine with a propeller to push the vehicle. There are louvers in the lifting scoops to regulate the height the vehicle travels on a cushion of air, and non-trip appendages on the tips of the lifting scoops to aid the scoops in lifting the vehicle from a surface.

2 Claims, 1 Drawing Sheet

SURFACE EFFECT VEHICLE

BACKGROUND OF THE INVENTION

The present invention relates to a surface effect vehicle, and in particular to a surface effect vehicle which is capable of lifting from a body of water on a cushion of air and moves over the water or ground in a stable manner.

Surface effect vehicles are used for moving just above the water, ground, or a combination of terrains, making them more efficient than either an in water vehicle, like a boat, or a ground vehicle, like an automobile. The reason being that when a vehicle is in contact with the water and the ground there is a large coefficient of friction. However, when a vehicle moves through a medium such as air, the coefficient of friction is substantially reduced. Surface effect vehicles ride on a cushion of air just above a surface, like water, where the friction-reducing cushion aids in the forward movement of the vehicle.

There is an acknowledged difference between flying aircraft and surface effect vehicles. Flying aircraft use the low pressure flow of air over the aircraft wing and the high pressure flow of air beneath the wing to create lift. Whereas, surface effect vehicles use the high pressure flow of air beneath an air foil to produce a cushion of air between the vehicle and a surface to separate the vehicle from the surface. Any forward movement of the surface effect vehicle is from some type of propulsion means. In essence, surface effect can not rise more than a few feet from the surface without redesigning the air foil and providing an elevator. To date, there has been a stabilization problem for surface effect vehicles designed to operate as a boat and as a surface effect vehicle. When departing one medium for another the hydrodynamic and aerodynamic forces on the vehicle are often difficult to control and stabilize. Some vehicles use air flaps on the rear of the vehicle to provide control and stabilization. Such arrangements are found in U.S. Pat. Nos. 3,918,382; 4,151,893 and 4,712,630.

There are several features of the present invention which provide stability to the surface effect vehicle. One of the features is a forward lifting scoop which functions like a pressure ramp to lift the vehicle over rough surfaces. The closest known prior art showing a lifting scoop is U.S. Pat. No. 3,908,783.

The primary object of the present invention is to provide a stable surface effect vehicle which overcomes the parting effect when leaving a medium such as water without any noticable control effects.

SUMMARY OF THE INVENTION

In accordance with the invention it is suggested to improve the two-wing vehicles of the types shown in U.S. Pat. Nos. 3,908,783 and 4,712,630. The surface effect vehicle of the invention has a forward lifting scoop air foil and a rear, or aft, lifting scoop air foil. The scoop-like air foils are arched to provide large air trapping surfaces for better lift and control. The lift scoops are arranged with the smaller scoop forward, and the larger scoop aft. The forward scoop does the initial lift-off and handles at most one-fourth of the total vehicle weight, while the larger aft scoop provides secondary lift-off and a majority of sustained lift. Using two separate lifting scoop air foils creates two separate surface effect pressures, however, both surface effect pressures are necessary to support the vehicle.

The sharp angle of attack and the ratios of the lifting scoops are important to the stability of the vehicle. For example, the forward scoop is about one-half the dimension of the aft scoop, and the hull does not contact the surface, such as water, thereby eliminating drag at lift-off. These factors increase the stability of the vehicle during lift-off and sustained lift. There are also gates in the scoops to regulate height and lift at high speeds.

Another stabilizing feature is non-trip appendages on the tips of each scoop to function as stabilizing skis on lift-off and landing. The non-trip appendages are set at an angle of about 30 degrees to promote lifting needed on lift-off and landing.

DESCRIPTION OF THE INVENTION

Figure 1:
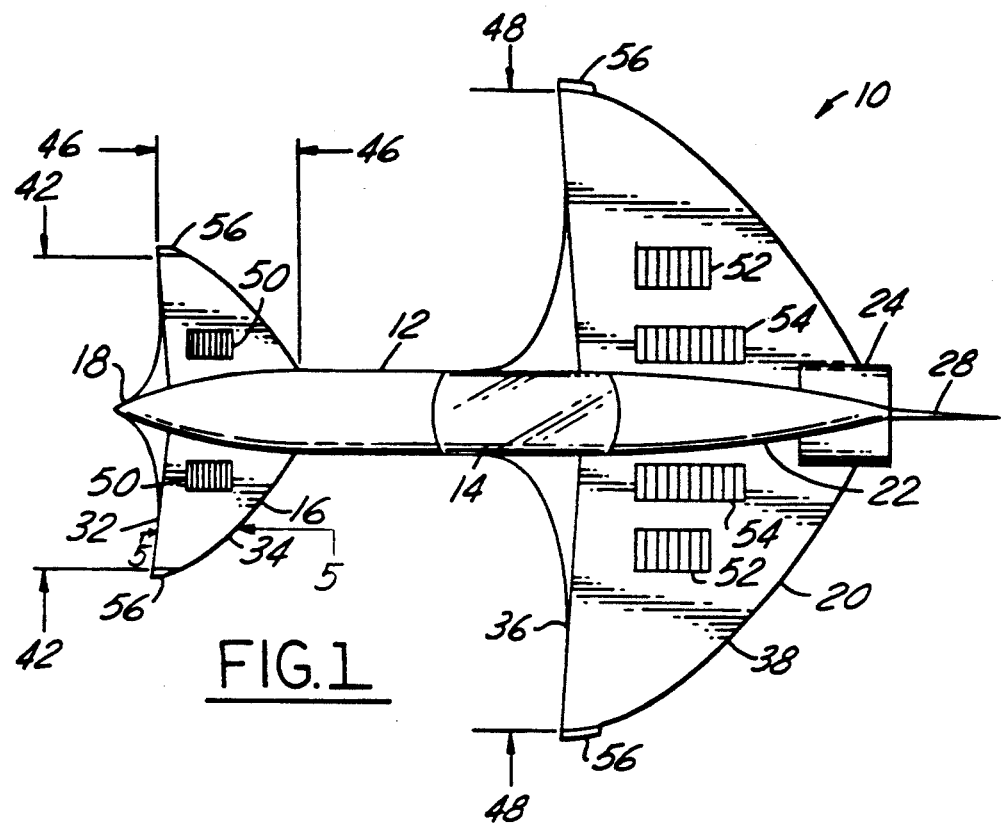
FIG. 1 is a top plan view of a surface effect vehicle of the invention.
Figure 2:
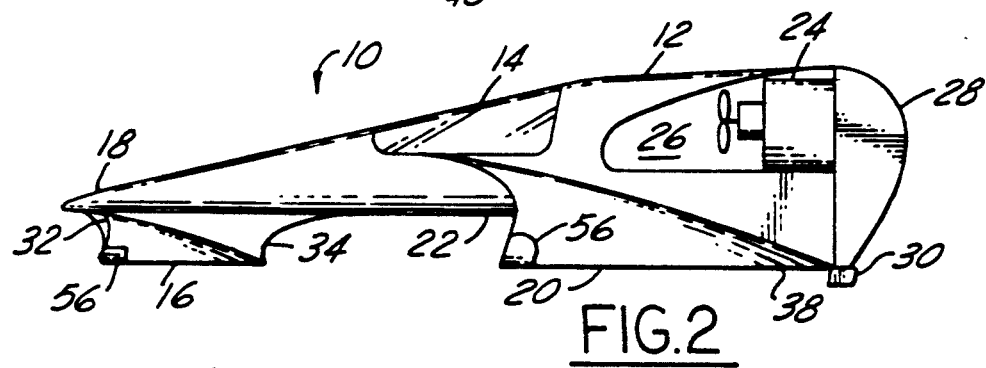
FIG. 2 is a side plan view of a surface effect vehicle of the invention.

Referring to the drawings, FIGS. 1-6 there is shown a surface vehicle 10 of the invention comprised of a hull or body 12, having an aerodynamic shape to reduce air resistance and a cockpit 14 streamlined to match the hull shape. A forward lifting scoop or air foil 16, is positioned near the nose 18 of the hull 12, and an aft lifting scoop or air foil 20, is positioned toward the rear 22 of hull 12. The hull 12 is suspended on the lifting scoops 16 and 20 above a ground or water surface to improve stability while reducing drag. A pusher engine 24, with a propeller, not shown, is mounted in space 26 behind cockpit 14. An air deflecting rudder 28 is mounted in the path of forced air from the engine propeller to steer the vehicle. For steering the vehicle on water a rudder 30 is mounted on the stern of the hull.

Figure 3:
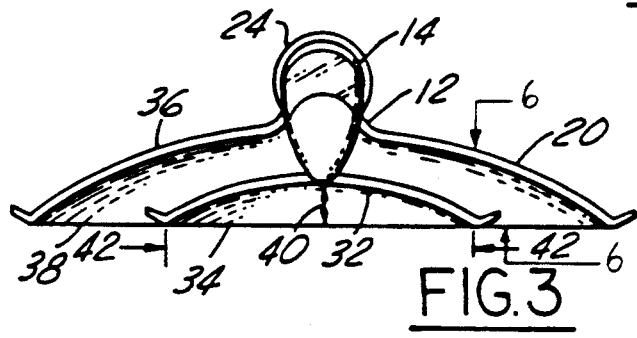
FIG. 3 is a front plan view of a surface effect vehicle of the invention.

Forward lifting scoop 16 and aft lifting scoop 20 have essentially the same design. Both scoops, 16 and 20, have a delta wing shape. While the apex of delta wings are generally facing forward, the scoops 16 and 20 have the apex facing rearward. The forward edge 32 is arched as shown in FIG. 3, to collect air. The trailing edge 34 is an arcuate curve that is flat, or parallel, to the horizontal, FIG'S 2 and 3, to trap the air collected under the arched lifting scoop's underside which extends from forward edge 32 to trailing edge 34. The lifting scoop 16 has an angle of attack which extends from edge 32 to trailing edge 34. The most desired angle is approximately 16 degrees to produce a pressure ramp in front of scoop 16. Aft lifting scoop 20 has the exact same configuration with a leading edge 36 and a trailing edge 38. The angle of attack will cause a stall effect should the air pressure collected under scoops 16 and 20 become too great which will prevent the vehicle from flying.

There are relationships of the lifting scoop which dictate their shapes. The height 40 of a scoop is one-seventh of its width or beam, 42. A scoop length 46 is determined as three-sevenths of its width or beam, 42.

The dementions are only shown on lift scoop 16, however, the same relationships, or ratios, apply to lifting scoop 20. Another relationship important to the vehicle 10 design, is the spacing between forward or leading edges 32 and 36 which is four-sevenths of aft scoop 20 width, or beam, 48. These relationships provide improved control and stability over known surface effect vehicles.

Forward lifting scoop 16 has one-half the area of aft lifting scoop 20. The smaller forward lifting scoop 16 provides the initial lift-off of vehicle 10; therefore, the smaller size and the forward position means that there is less weight to be lifted, consequently the nose 18 almost immediately lift off. The angle of attack of scoop 16 increases its efficiency for lift-off. Likewise, once the nose 18 lifts-off, the larger aft lifting scoop 20 which is filled with air begins to lift-off, carrying the heavier rearward weight of the vehicle.

Figure 4:
FIG. 4 is a schematic of a louver of the invention.

FIG. 1 shows lifting scoop 16 with waste louvers 50, and lifting scoop 20 with two pairs of waste louvers 52 and 54. These waste louvers 50, 52 and 54 can be opened automatically or manually to regulate the height the surface effect vehicle 10 maintains over the water or some other surface. Additionally, louvers 50, 52 and 54 prevent instability, or spill lift, at high speeds. The surface effect vehicle obtains speeds in excess of 85 miles per hour. Having waste louvers cuts out dangerous lifting of nose 18 which could create a sudden unstable condition. Also, the same dangerous condition exists for the aft lifting scoop 20. The louvers 50 can either work together with louvers 52 and 54, or independent of them. A typical louver 50, etc., is shown in FIG. 4, opened to reduce the lift on one of the scoops.

Figure 5:
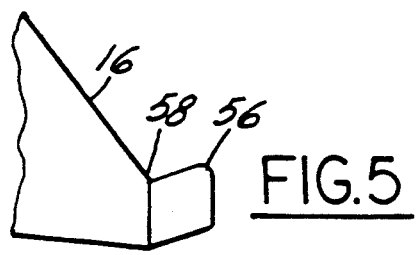
FIG. 5 is a partial top view of a lifting scoop of the invention, taken along the line 5—5 of FIG. 1.
Figure 6:
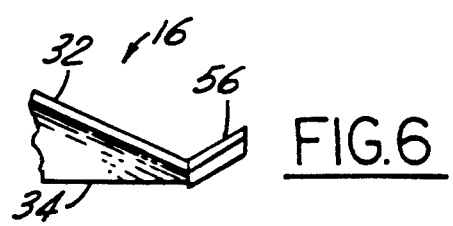
FIG. 6 is a partial front view of a lifting scoop of the invention taken along the line 6—6 of FIG. 3.

Each of the scoops 16 and 20 has non-trip appendages, or stabilizing skis 56 on each of the tips 58, FIGS. 5 and 6. On lift-off the appendages 56, which are at an angle of 30 degrees to the water or other surface, function like skis to aid in lift-off. Also, the appendages 56 prevent the tips 58 from "digging" into the water which would trip the scoop tip, thereby losing stability.

Flotation is achieved around the perimeter of the scoop.

While only one embodiment of the invention is shown, it should be realized that other embodiments could be forthcoming, therefore, the drawings, description and claims should be studied for a full understanding of the invention.

I claim:

1. A surface effect vehicle for use on water and other surfaces, comprising:
   a vehicle having a body with a nose section, a cockpit and an aft section;
   a pair of lifting scoop means mounted on said body, where said lifting scoop means includes a first scoop means mounted on said nose section and a second scoop means mounted on said aft section, said first scoop means having one-half the area of said second scoop means to provide initial lift of said nose section;
   said first scoop means and said second scoop means each having a delta shape with an apex facing said aft section, and an arched leading edge at the broadest width of said delta shape facing said nose section;
   a pusher type engine with a propeller mounted on said body to move said surface effect vehicle, and a rudder mounted behind said engine to turn said vehicle, where said pair of lifting scoop means collect air under said delta shape to lift and support said vehicle over a surface to allow said vehicle to move on a cushion of air;
   said first scoop means and said second scoop means having a height and width at said leading edge in a ratio of about 1:7, where 1 represents the height;
   said first scoop means and said second scoop means each having a length extending along said body, starting at said leading edge, and said width at said leading edge in a ratio of about 3:7, where 3 represents the length;
   said first scoop means is separated from said second scoop means by a ratio of about 4:7 where 4 is measured from said leading edge of said first scoop means to said leading edge of said second scoop means, and 7 is the width of said leading edge of said second scoop means;
   said first scoop means and said second scoop means each having an angle of attack of about 16 degrees from the horizontal measured from the rear of said scoop means to said arched leading edge to provide lift-off for said vehicle;
   said first scoop means having a movable louver means to open and close to regulate the height said vehicle travels over a surface;
   said second scoop means having at least one pair of louver means to open and close to regulate the height said vehicle travels over a surface;
   said first scoop means and said second scoop means having tips, and non-trip appendage means extending from said tips at an upward angle to the horizontal to provide lift-off to part said vehicle from a surface;
   said appendage means having an upward angle to the horizontal of about 30 degrees;
   said body is supported on said first scoop means and said second scoop means above a surface when said scoop means are in contact with the surface.

2. A surface effect vehicle as in claim 1 wherein a surface engaging rudder is mounted on the aft section of said body to steer said vehicle.

* * * * *